United States Patent
Reynolds

(10) Patent No.: US 11,644,895 B1
(45) Date of Patent: May 9, 2023

(54) ATTENTION CUES FOR HEAD-MOUNTED DISPLAY (HMD)

(71) Applicant: Synaptics Incorporated, San Jose, CA (US)

(72) Inventor: Joseph Kurth Reynolds, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 0 days.

(21) Appl. No.: 17/497,781

(22) Filed: Oct. 8, 2021

(51) Int. Cl.
| | |
|---|---|
| G06F 3/01 | (2006.01) |
| G02B 27/00 | (2006.01) |
| G02B 27/01 | (2006.01) |
| G06T 19/00 | (2011.01) |

(52) U.S. Cl.
CPC .......... G06F 3/013 (2013.01); G02B 27/0093 (2013.01); G02B 27/0101 (2013.01); G02B 27/017 (2013.01); G06F 3/012 (2013.01); G06T 19/006 (2013.01); *G02B 2027/0138* (2013.01)

(58) Field of Classification Search
CPC ..... G06F 3/013; G06F 3/012; G02B 27/0093; G02B 27/0101; G02B 27/017; G02B 2027/0138; G06T 19/006
See application file for complete search history.

(56) References Cited

U.S. PATENT DOCUMENTS

| | | | | |
|---|---|---|---|---|
| 2018/0275753 | A1* | 9/2018 | Publicover | G06F 3/04812 |
| 2020/0209624 | A1* | 7/2020 | Sztuk | G06T 19/00 |
| 2021/0160561 | A1* | 5/2021 | Miyamoto | H04N 7/007 |
| 2021/0192856 | A1* | 6/2021 | Lee | G06T 19/20 |
| 2021/0281802 | A1* | 9/2021 | Kirisken | G02B 27/017 |

OTHER PUBLICATIONS

Blue, Alexis, "'Googly Eyes' Bridge Gap Between Virtual and Actual Reality," University Communications, Nov. 6, 2019, pp. 1-5, https://uascience.org/2019/10/30/googly-eyes-bridge-gap-between-virtual-and-actual-reality/.
Karlén, Joakim, "Eye-Tracking is Virtual Reality's Next Frontier," Venturebeat, Sep. 6, 2017, pp. 1-8, https://venturebeat.com/2017/09/06/eye-tracking-is-virtual-realitys-next-frontier/.
Steptoe, Wiliam et al., "Eye-Tracking for Avatar Eye-Gaze and Interactional Analysis in Immersive Collaborative Virtual Environments," CSCW'08, Nov. 8-12, 2008, San Diego, California, USA., pp. 197-200.

* cited by examiner

*Primary Examiner* — Amit Chatly
(74) *Attorney, Agent, or Firm* — Paradice & Li LLP

(57) ABSTRACT

This disclosure provides methods, devices, and systems for indicating an attentiveness of a user of a head-mounted display (HMD) device. The HMD device may include a camera configured to capture images of the surrounding environment, an electronic display configured to display the images captured by the camera, and one or more sensors configured to track a direction of gaze of the user. In some aspects, the HMD device may output an attention cue based on the images displayed on the electronic display and the user's direction of gaze. The attention cue may indicate an attentiveness of the user to a person or object in the surrounding environment. In some implementations, the attention cue may be output via an attention indicator disposed on an outer surface of the HMD device. In some other implementations, the attention cue may be output via a communication interface that communicates with another HMD device.

17 Claims, 12 Drawing Sheets

ATTENTION CUES FOR HEAD-MOUNTED DISPLAY (HMD)

TECHNICAL FIELD

The present implementations relate generally to display technologies, and specifically to attention cues for head-mounted displays (HMDs).

BACKGROUND OF RELATED ART

Head-mounted display (HMD) devices are configured to be worn on, or otherwise affixed to, a user's head. An HMD device may include one or more displays positioned in front of one, or both, of the user's eyes. The positioning of the displays provides an immersive experience for the user of the HMD device. As such, HMD devices are well-suited for extended reality (XR) applications (including virtual reality (VR), augmented reality (AR), and merged reality (MR), among other examples). XR has applications in medical, military, gaming, aviation, engineering, and various other professional and/or entertainment industries.

In some XR applications, an HMD device may display or render media content (such as still images, sequences of images, or videos) from an image source overlaid with information or images from the user's surrounding environment (such as captured by a front-facing camera). As such, the HMD device enables users to interact with persons or objects in a physical environment in combination with immersive elements of a virtual environment or in a purely virtual environment. For example, a user working from home may wear an HMD device that immerses the user in a virtual office environment. More specifically, the HMD device may display media content that merges persons or objects in the user's home (such as from images or video captured by the front-facing camera) with virtually-rendered persons or objects (such as from data associated with an XR application). However, because the HMD device obfuscates the user's eyes, there is a need to improve interaction and reduce miscommunication with persons or objects facing the user.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method performed by a head-mounted display (HMD) device. The method includes steps of rendering media content on an electronic display disposed on a first inner surface of the HMD device, where the media content includes at least a portion of a scene in a field-of-view (FOV) of a camera disposed on an outer surface of the HMD device; receiving gaze information from one or more sensors disposed on a second inner surface of the HMD device, where the gaze information indicates a direction of gaze of a user of the HMD device; and outputting an attention cue based at least in part on the direction of gaze and the media content rendered on the electronic display, where the attention cue indicates an attentiveness of the user to one or more objects in the scene.

Another innovative aspect of the subject matter of this disclosure can be implemented in a controller for an HMD device including a processing system and a memory. The memory stores instructions that, when executed by the processing system, causes the controller to render media content on an electronic display disposed on a first inner surface of the HMD device, where the media content includes at least a portion of a scene in an FOV of a camera disposed on an outer surface of the HMD device; receive gaze information from one or more sensors disposed on a second inner surface of the HMD device, where the gaze information indicates a direction of gaze of a user of the HMD device; and output an attention cue based at least in part on the direction of gaze and the media content rendered on the electronic display, where the attention cue indicates an attentiveness of the user to one or more objects in the scene.

Another innovative aspect of the subject matter of this disclosure can be implemented in an HMD device including a camera disposed on an outer surface of the HMD device; an electronic display disposed on or projecting through a first inner surface of the HMD device and configured to display media content that includes at least a portion of a scene in an FOV of the camera; one or more sensors disposed on a second inner surface of the HMD device and configured to capture gaze information indicating a direction of gaze of a user of the HMD device; and a notification interface configured to output an attention cue based at least in part on the direction of gaze and the media content rendered on the electronic display, where the attention cue indicates an attentiveness of the user to one or more objects in the scene.

BRIEF DESCRIPTION OF THE DRAWINGS

The present implementations are illustrated by way of example and are not intended to be limited by the figures of the accompanying drawings.

DETAILED DESCRIPTION

Figure 1A:
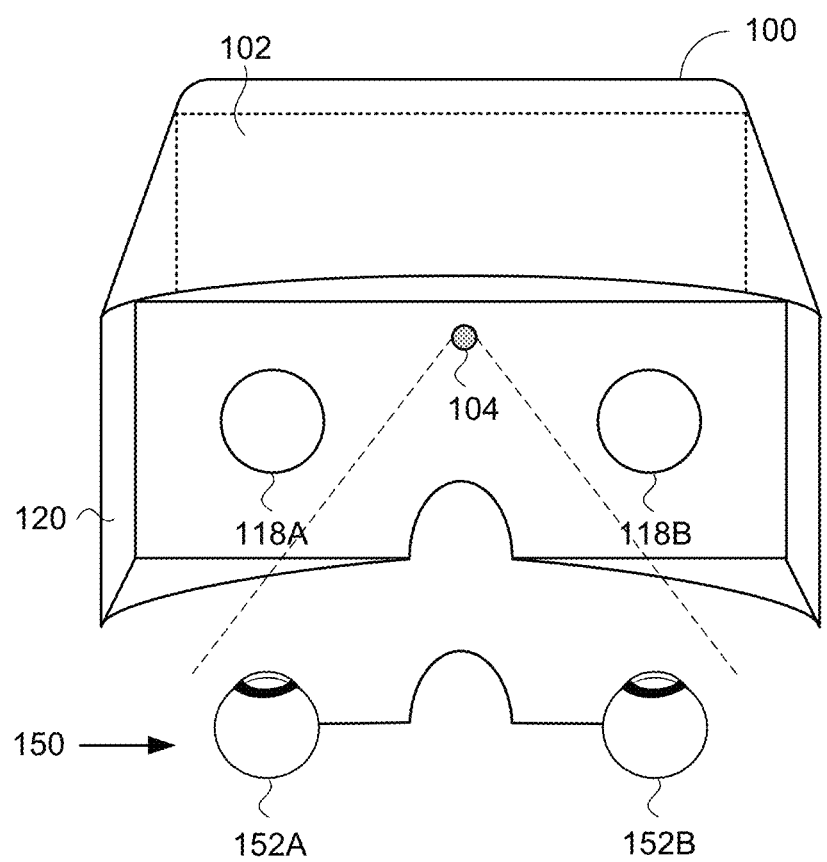
FIGS. 1A and 1B show an example HMD device, according to some implementations.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, perform one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the implementations disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, a head-mounted display (HMD) device may enable a user to interact with persons or objects in a physical environment with virtually-rendered persons or objects associated with an extended reality (XR) application. Accordingly, persons or objects in the physical environment may be collectively referred to as "physical objects," whereas persons or objects associated with XR application may be collectively referred to as "virtual objects." To provide a fully immersive experience, the electronic displays or housing of the HMD device may obfuscate the user's eyes. However, aspects of the present disclosure recognize that a person's direction of gaze may be used to indicate where the person's attention is directed. Thus, because the user's eyes are obfuscated by the electronic displays or housing, other attention cues are needed on an HMD device to indicate the user's attention to other people in the physical environment.

Various aspects relate generally to HMD devices, and more specifically to attention cues that can indicate an attention of a user of an HMD device. The HMD device may include a camera configured to capture images (or video) of the surrounding environment, an electronic display configured to display the images (or portions thereof) captured by the camera, and one or more sensors configured to track a direction of gaze of the user. Alternately, visual information may be directly transmitted on a semi-transparent display allowing overlay of virtual images (such as in AR). In some aspects, the HMD device may output an attention cue based on the images displayed on the electronic display and the user's direction of gaze. The attention cue may indicate an attentiveness of the user to a person or object in the camera's FOV (such as in the surrounding environment). In some implementations, the attention cue may be output via an attention indicator disposed on an outer surface of the HMD device. In some other implementations, the attention cue may be output via a communication interface that communicates with another HMD device (for example, to be rendered on a display of the other HMD device).

Particular implementations of the subject matter described in this disclosure can be implemented to realize one or more of the following potential advantages. By providing attention cues that indicate the attentiveness of the user to a person or object in the camera's FOV, aspects of the present disclosure may improve social interactions between users of HMD devices and people in the surrounding environment. For example, the attention cue may signal that the user of the HMD device is interested or engaged with another person in the vicinity (by displaying visual attention information). Outputting the attention cue via an attention indicator (such as an external display) on the HMD device allows the user to show interest or engagement with other people in a real-world environment (such as people not wearing HMD devices of their own). On the other hand, outputting the attention cue to another HMD device allows the user to show interest or engagement with other people in a virtual environment.

Figure 1B:
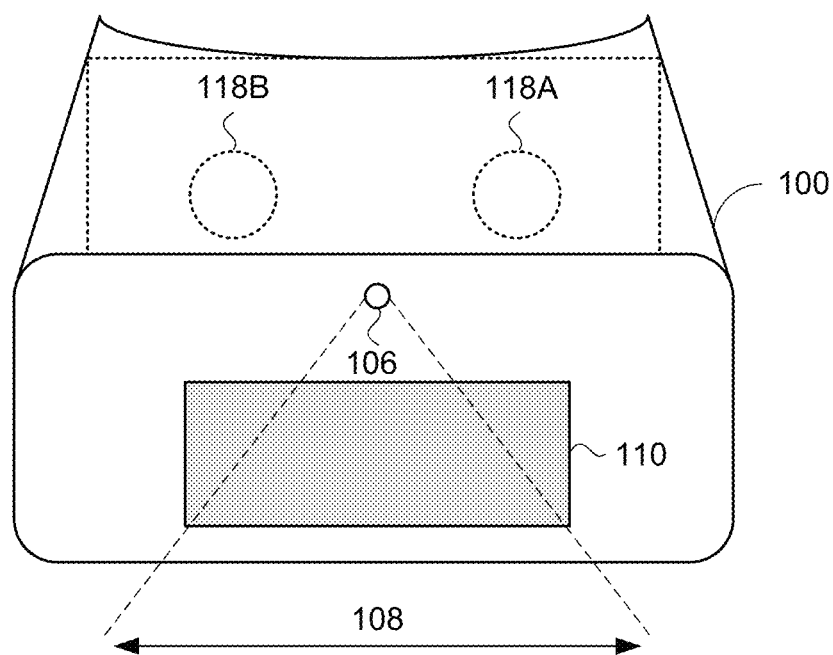

FIGS. 1A and 1B show an example HMD device 100, according to some implementations. More specifically, FIG. 1A depicts the back of the HMD device 100 and FIG. 1B depicts the front of the HMD device 100. For purposes of the present description, the term "back of the HMD device" refers to the side of the device which is against the user's face, and the term "front of the HMD device" refers to the side of the device which faces the external environment. The HMD device 100 is designed to be worn on the head of a user 150, covering the user's eyes 152A and 152B. In some implementations, the HMD device 100 may include a housing 120, an electronic display 102, an eye tracker 104, a camera 106, lenses 118A and 118B, and an attention indicator 110.

As shown in FIG. 1A, the electronic display 102 is disposed on an inner surface of the HMD device 100 (covered or encapsulated by the housing 120), facing the user's eyes 152A and 152B. More specifically, the housing 120 is designed to block ambient light from entering the user's eyes 152A and 152B when the HMD device 100 is worn by the user 150. The electronic display 102 may use any type of display technology that can display an image or sequence of images (e.g., video). Example suitable display technologies may include, but are not limited to, light emitting diode (LED), organic LED (OLED), cathode ray tube (CRT), liquid crystal display (LCD), plasma, and electroluminescence (EL). This includes projective display technologies on refractive, semi reflective, semi transparent surfaces such as LCD on Silicon.

The lenses 118A and 118B are configured to focus the user's eyes 152A and 152B, respectively, on the electronic display 102. In some implementations, the electronic display 102 may be a single display panel. In such implementations, the lenses 118A and 118B may focus the user's eyes 152A and 152B, respectively, on the same display panel. In some other implementations, the electronic display 102 may include two or more display panels. In such implementations, the lenses 118A and 118B may focus the user's eyes 152A and 152B, respectively, on different display panels.

The eye tracker 104 includes one or more sensors configured to track the movements or rotations of the user's eyes 152A and 152B while the user 100 is wearing the HMD device 100. For example, the eye tracker 104 may include one or more cameras disposed on an inner surface of the HMD device 100, facing the user's eyes 152A and 152B. The eye tracker 104 may determine the rotation of the user's eyes 152A and 152B based on corneal reflections and the centers of the pupils or other methods for determining the rotation of the user's eyes 152A and 152B. The eye tracker 104 may output gaze information based on the angle or direction of rotation. Thus, the gaze information may indicate a direction of gaze of the user 100 (e.g., relative to head motion and/or projected virtual scenes). Furthermore, the eye tracker may provide information used to render (or render at higher resolution) those areas of attention where the eye is focused (also referred to as a foveal region of the display). Rapid motion of the eye's focus (e.g., angles or depth) may be filtered or correlated to provide or display more useful attention information.

As shown in FIG. 1B, the camera 106 is disposed on an outer surface of the HMD device 100 (on the outside of the housing 120), facing the front of the HMD device 100. For example, the camera 106 may include one or more optical sensors (such as photodiodes, CMOS image sensor arrays, CCD arrays, and/or any other sensors capable of detecting wavelengths of light in the visible spectrum, the infrared spectrum, and/or the ultraviolet spectrum). The camera 106 may be configured to capture images (or video) of the environment surrounding the user 150. More specifically, a field-of-view (FOV) 108 of the camera 106 may coincide or align with a FOV of the user's eyes 152A and 152B such that the images captured by the camera 106 depict a scene in the user's line of sight unobstructed by the HMD device 100. Furthermore, a forward-facing camera may (e.g., along with other cameras) also be used for "inside out" head motion tracking.

In some implementations, the HMD device 100 may display or render the images captured by the camera 106 on the electronic display 102. In some other implementations, the HMD device 100 may display or render the captured images overlaid with virtually-rendered objects or images associated with an XR application. As such, the HMD device 100 enables the user 150 to interact with persons or objects in a physical environment in combination with immersive elements of a virtual environment. For example, the HMD device 100 may immerse the user 150 in a virtual office environment while the user 150 is working from home. More specifically, the electronic display 102 may display media content that combines elements of the virtual office with persons or objects in the surrounding environment (such as in the FOV 108 of the camera 106).

In some aspects, the HMD device 100 may determine an attentiveness of the user 100 based on the media content rendered on the electronic display 102 and the gaze information captured by the eye tracker 104. More specifically, the HMD device 100 may map the user's direction of gaze to a focal point or region on the electronic display 102 to determine which (if any) objects in the media content have captured the attention of the user 150. In some implementations, the HMD device 100 may determine, based on the mapping, whether the user's attention is focused on a physical person or object in the FOV 108 of the camera 106. In some other implementations, the HMD device 100 may determine, based on the mapping, whether a physical person or object in the FOV 108 of the camera 106 is occluded by one or more virtually-rendered objects.

In some aspects, the HMD device 100 may output an attention cue via the attention indicator 110. The attention cue may be a visible or audible notification that indicates the attentiveness of the user 150 to one or more objects real or virtual (including other people or their avatars) in the surrounding environment. As such, the attention indicator 110 may include one or more visual or audio output components that can be used to render or output the attention cue. For example, the attention indicator 110 may include a dynamic display element that uses any type of display technology (such as LED, OLED, CRT, LCD, plasma, or electroluminescence) to display images or video. In some implementations, the attention indicator 110 may output a pattern of sounds or lights (such as images of, or representative of, the user's eyes) to indicate that the user's attention is focused on a person in the FOV 108 of the camera 106. In some other implementations, the attention indicator 110 may output a different pattern of sounds or lights (e.g., eye indicators may be missing) to indicate that the user's attention is not focused on the person in the FOV 108 of the camera 106 (such as when the person is occluded by one or more virtually-rendered objects) or is simply outside their effective field of view.

Figure 2A:
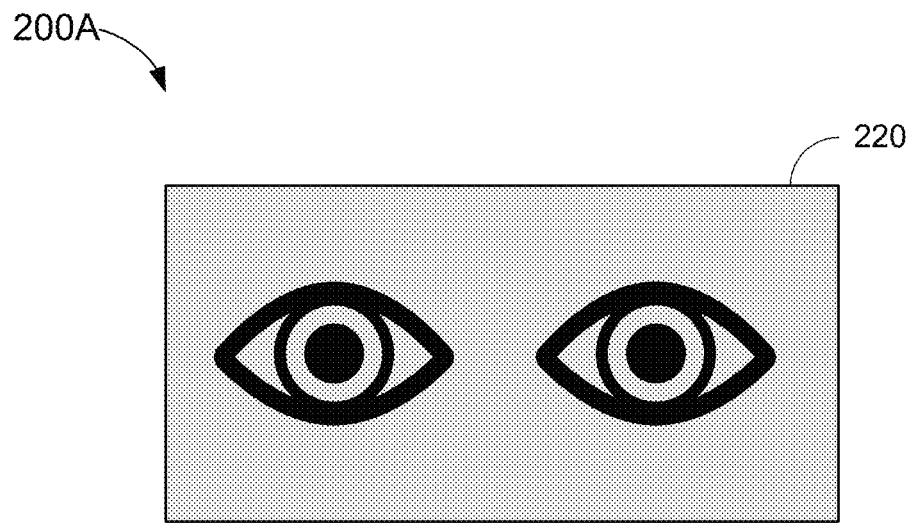
FIGS. 2A and 2B show example attention cues that can be output by an attention indicator of an HMD device, according to some implementations.
Figure 2B:
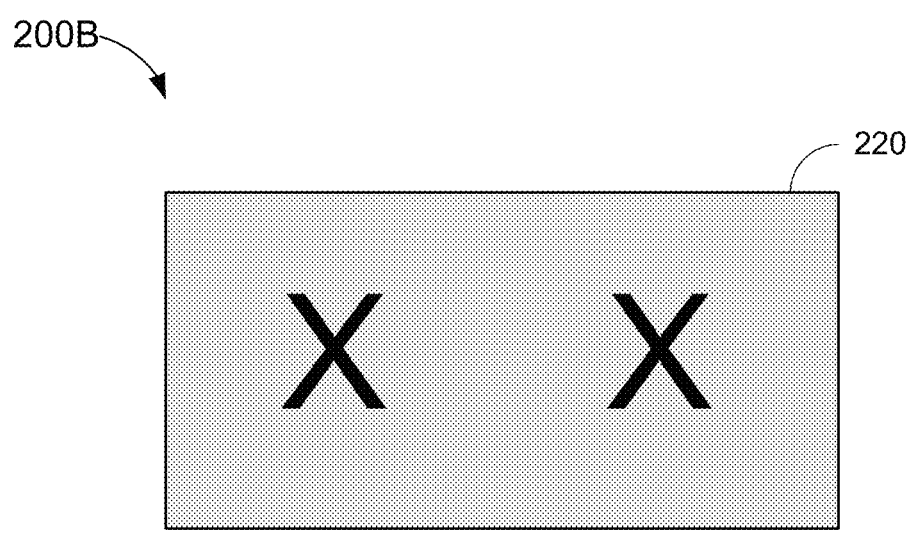

FIGS. 2A and 2B show example attention cues 200A and 200B, respectively, that can be output by an attention indicator 220 of an HMD device, according to some implementations. In some implementations, the attention indicator 220 may be one example of the attention indicator 110 of FIG. 1B.

In the example of FIG. 2A, the attention of a user of the HMD device may be focused on a physical person or object in the FOV of a camera disposed on an outer surface of the HMD device (such as the camera 106 of FIG. 1B). Thus, the attention cue 200A includes a rendering of a representative pair of eyes in the open position (e.g., as opposed to closed eyes, "X's," or lack of eyes). In some implementations, the eyes may be animated to track the physical person or object in the surrounding environment. For example, the position of the eyes in the attention indicator 220 may be aligned with the user's direction of gaze inside the HMD device.

In the example of FIG. 2B, the user's attention may be focused away from the physical person or object in the FOV of the camera. In some instances, the user's attention may be focused on a region of the display that does not align with the physical person or object. In some other instances, the physical person or object may be occluded by one or more virtually-rendered objects (e.g., monitors, walls, or other avatars) associated with an XR application. Thus, the attention cue 200B includes a rendering of a pair of X's in place of the eyes of FIG. 2A.

The example attention cues 200A and 200B are described for purposes of illustration only. In actual implementations, various other images, symbols, or patterns may be displayed by the attention indicator 220 to indicate that the user's attention is focused on a physical person or object in the FOV of the camera (in lieu of the eyes depicted in FIG. 2A) or that the user's attention is focused away from the physical person or object in the FOV of the camera (in lieu of the X's depicted in FIG. 2B). Further, estimated head orientation (position and rotation) may be used to usefully display (or calculate the location or angle of) the representative eyes.

Figure 3:
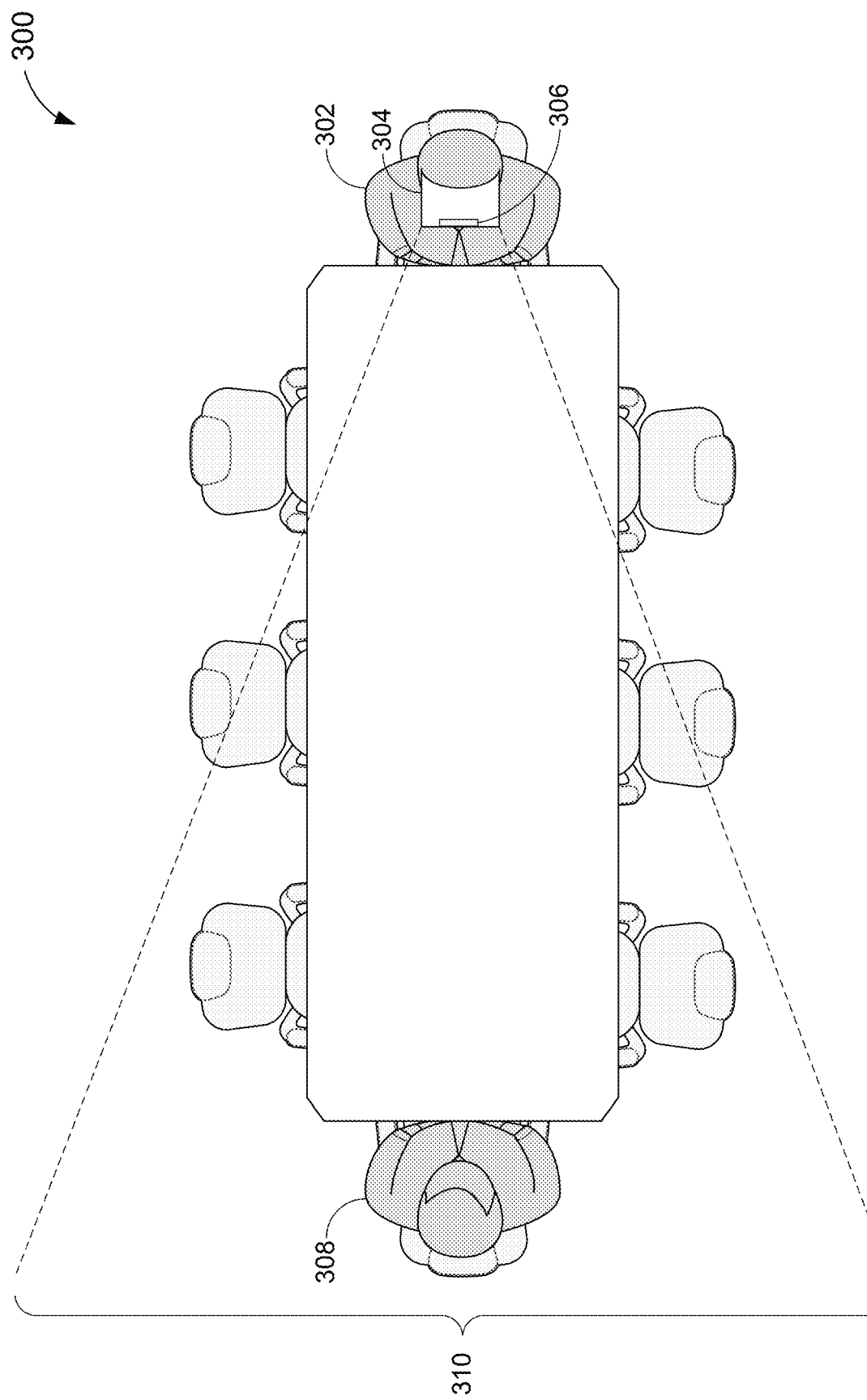
FIG. 3 shows an example environment viewable by a user of an HMD device.

FIG. 3 shows an example environment 300 viewable by a user 302 of an HMD device 304. In some implementations, the HMD device 304 may be one example of the HMD device 100 of FIGS. 1A and 1B. The environment 300 includes a person 306 sitting at a table across from the user 302. As shown in FIG. 3, the person 306 is located in an FOV 310 of the HMD device 304 (such as the FOV 108 of the camera 106).

In some implementations, the HMD device 304 may display at least a portion of a scene in its FOV 310 to the user 302 (via the electronic display 102) and may track the user's attention in relation to one or more objects in the scene (using the eye tracker 104), such as described with reference to FIGS. 1A and 1B. In some implementations, the HMD device 304 may further output an attention cue based on the attentiveness of the user 302. For example, the attention cue may indicate whether the user's attention is focused on the person 308.

In the example of FIG. 3, the HMD device 304 may output the attention cue via an attention indicator 306. More specifically, the attention indicator 306 may output a first attention cue (e.g., open active eyes versus closed or missing representative eyes) to indicate that the user 302 is focused on the person 308 (such as described with reference to FIG. 2A) or a second attention cue to indicate that the user 302 is not focused on the person 308 (such as described with reference to FIG. 2B). Accordingly, the person 308 may observe the attention indicator 306 to determine the user's level of attention or engagement with the surrounding environment 300.

Figure 4A:
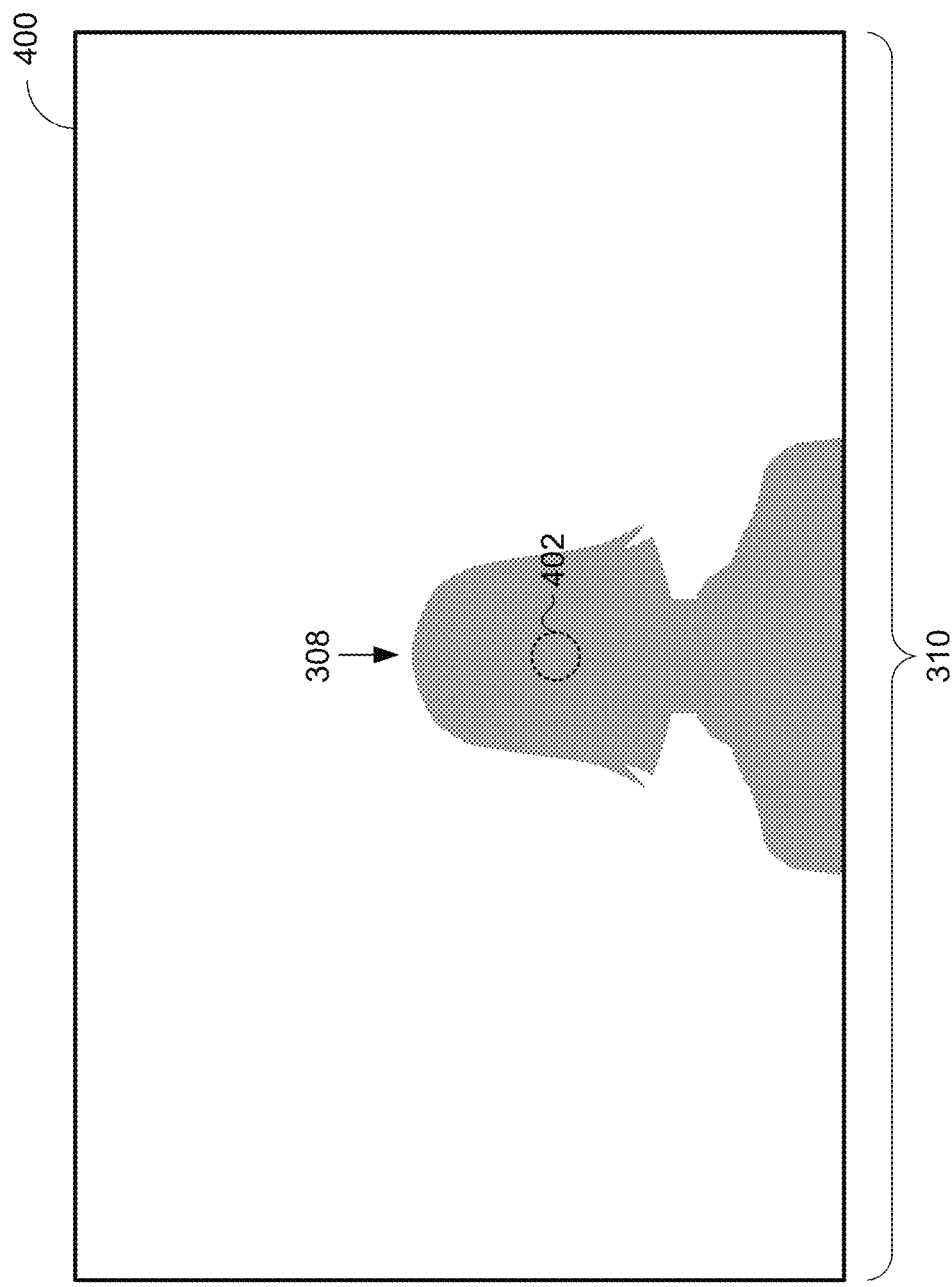
FIGS. 4A-4C show example media content that can be rendered on a display of an HMD device.

FIG. 4A shows example media content that can be rendered on a display 400 of an HMD device. In some implementations, the HMD device may be one example of the HMD device 304 of FIG. 3. More specifically, the media content includes the scene in the FOV 310 of the HMD device 304.

In the example of FIG. 4A, the HMD device 304 may determine that the user's attention is focused on the person 308. For example, the HMD device 304 may map the user's direction of gaze to a focal point (or region) 402 of the display 400. The HMD device 304 may further determine that the focal point 402 coincides (or is aligned) with the person 308 in the displayed media content. Accordingly, the HMD device 304 may output an attention cue indicating that the user is focused on the person 308 (such as described with reference to FIG. 2A).

Figure 4B:
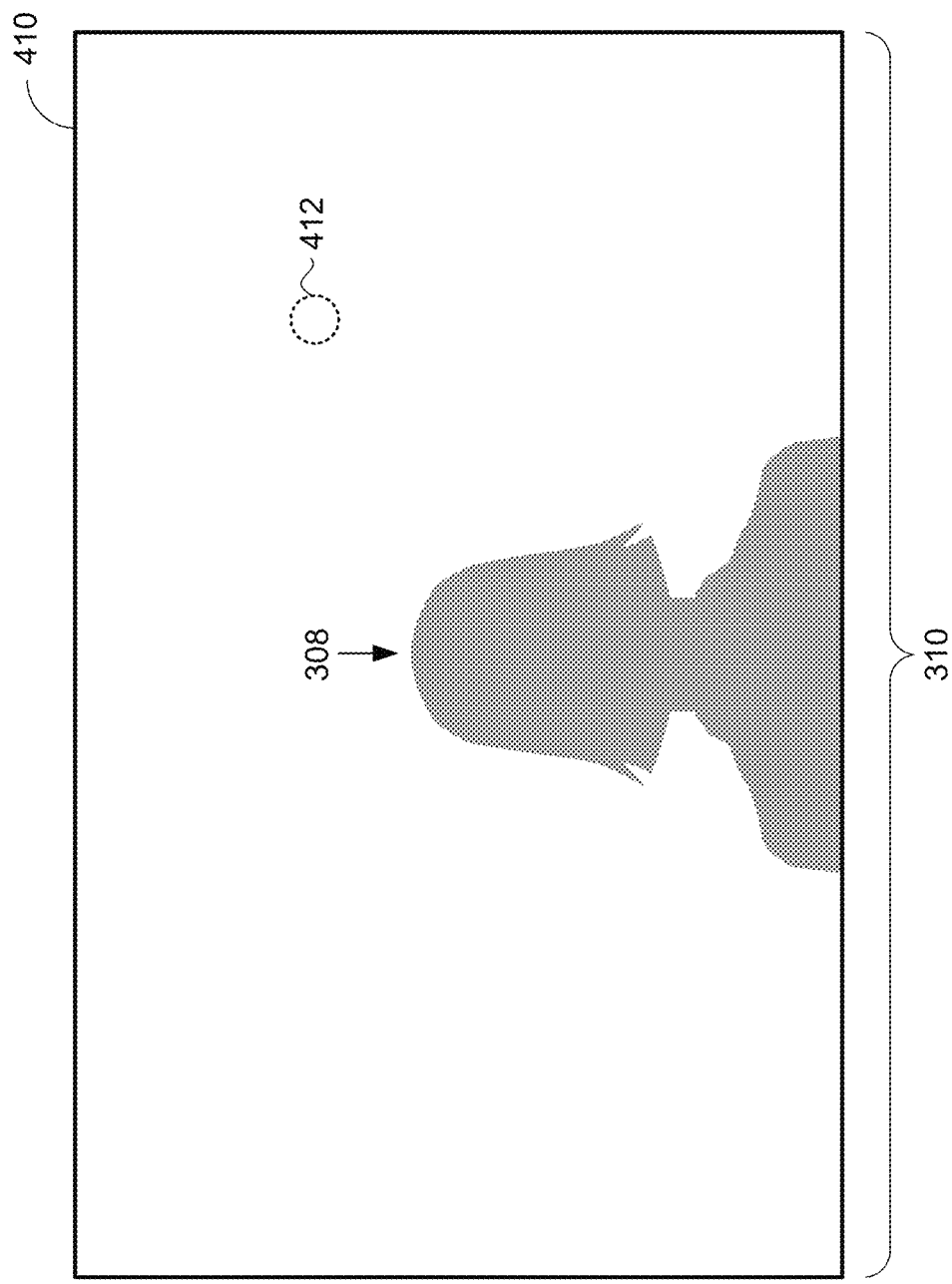

FIG. 4B shows example media content that can be rendered on a display 410 of an HMD device. In some implementations, the HMD device may be one example of the HMD device 304 of FIG. 3. More specifically, the media content includes the scene in the FOV 310 of the HMD device 304.

In the example of FIG. 4B, the HMD device 304 may determine that the user's attention is focused away from the person 308. For example, the HMD device 304 may map the user's direction of gaze (e.g., relative to head orientation) to a focal point (or region) 412 of the display 410. The HMD device 304 may further determine that the focal point 412 does not coincide (or is not aligned) with the person 308 in the displayed media content. Accordingly, the HMD device 304 may output an attention cue indicating that the user is not focused on the person 308 (such as described with reference to FIG. 2B).

Figure 4C:
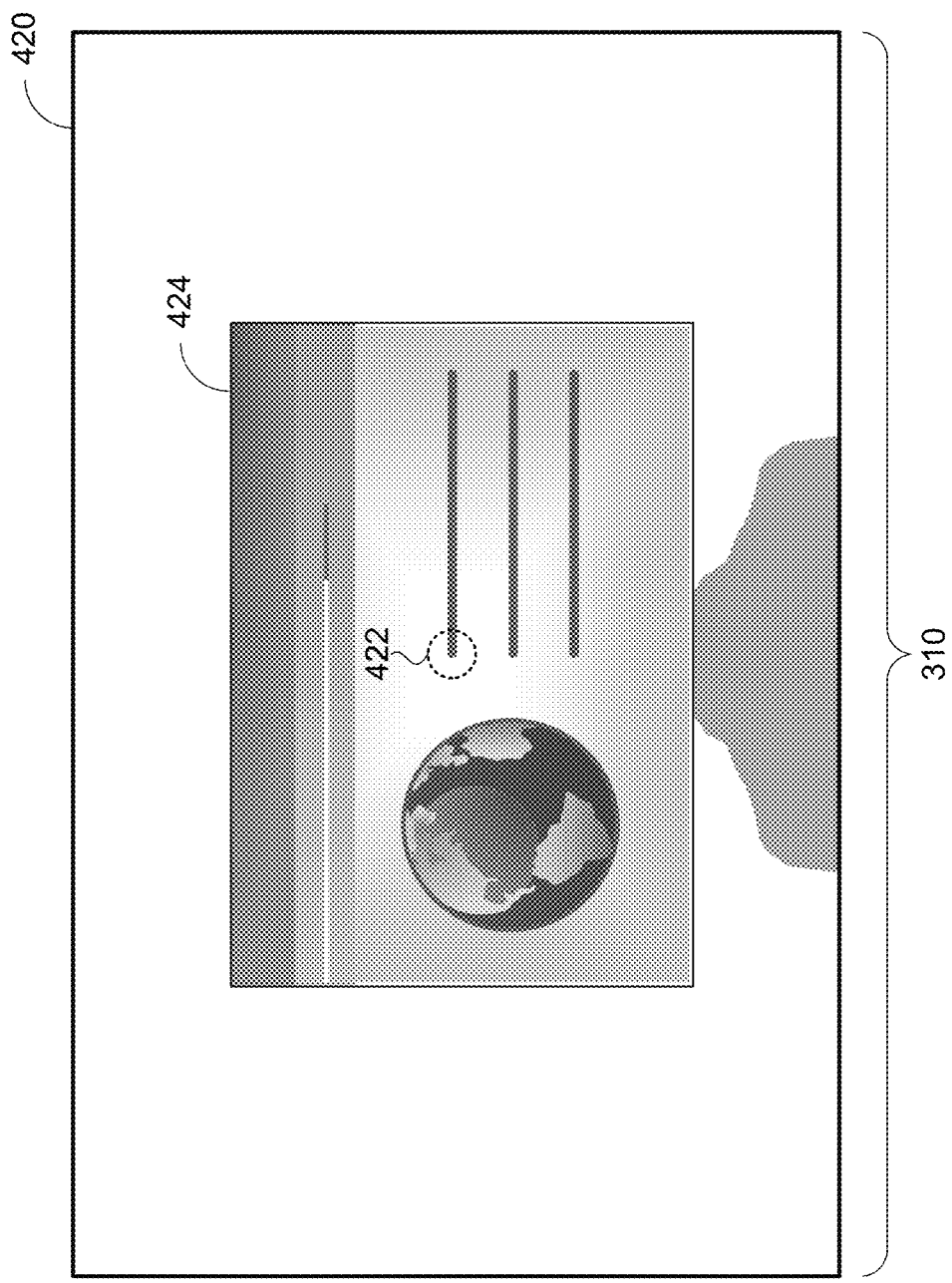

FIG. 4C shows example media content that can be rendered on a display 410 of an HMD device. In some implementations, the HMD device may be one example of the HMD device 304 of FIG. 3. More specifically, the media content includes the scene in the FOV 310 of the HMD device 304 and a virtually-rendered object 424 (such as a web page) overlaid on top of the scene.

In the example of FIG. 4C, the HMD device 304 may determine that the person 308 in the scene is occluded by the object 424. For example, the HMD device 304 may map the user's direction of gaze to a focal point (or region) 422 of the display 420. The HMD device 304 may further determine that the focal point 422 coincides (or is aligned) with the object 424 in the displayed media content. More specifically, the HMD device 304 may determine that the object 424 blocks or occludes the person 308 based on the user's direction of gaze. Accordingly, the HMD device 304 may output an attention cue indicating that the user is not focused on the person 308 (such as described with reference to FIG. 2B).

Figure 5:
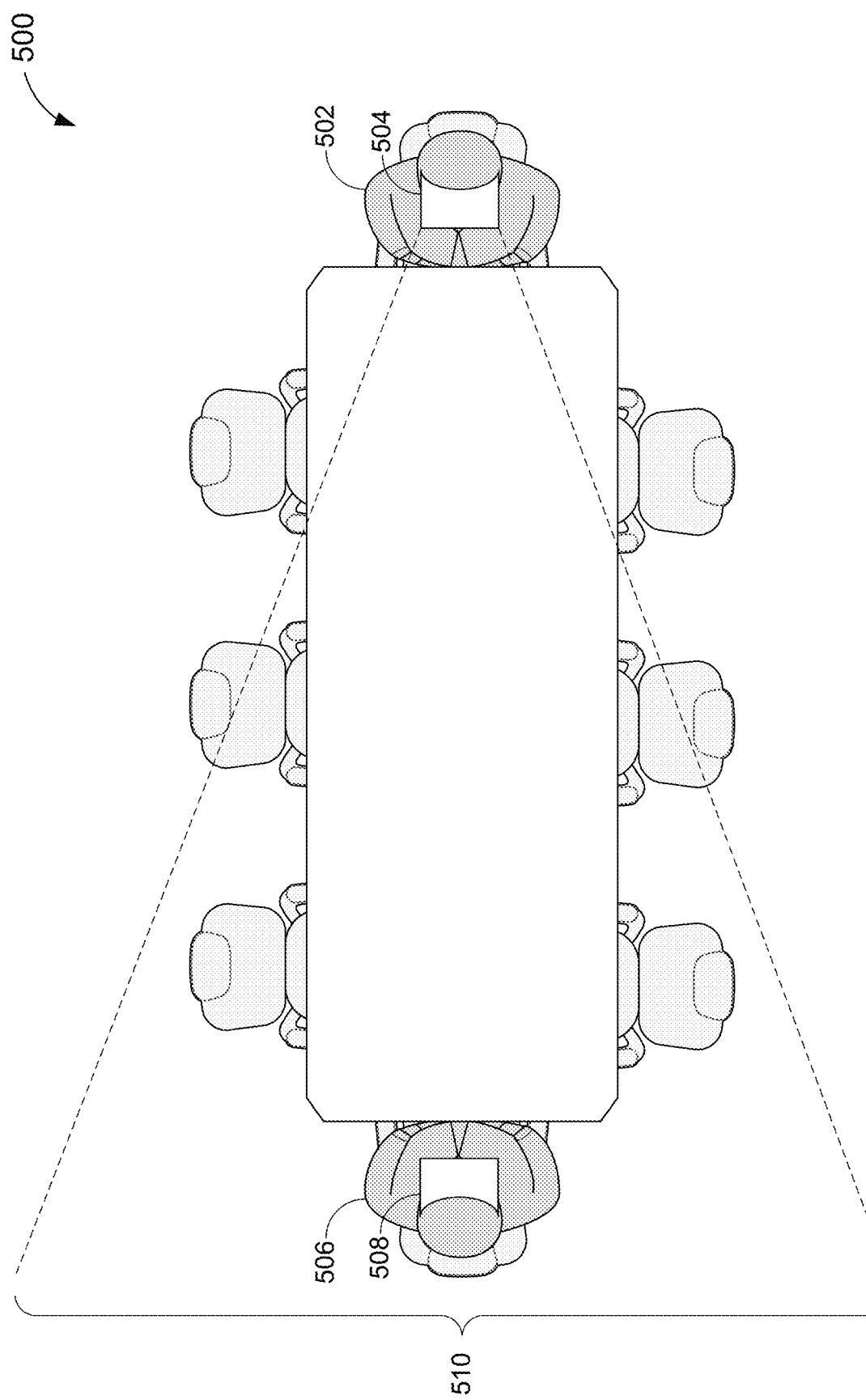
FIG. 5 shows another example environment in which an XR application can be implemented.

FIG. 5 shows another example environment 500 viewable by a user 502 of an HMD device 504. In some implementations, the HMD device 504 may be one example of the HMD device 100 of FIGS. 1A and 1B. The environment 500 includes a person 506 sitting at a table across from the user 502. In the example of FIG. 5, the person 506 is located in an FOV 510 of the HMD device 504 (such as the FOV 108 of the camera 106).

In some implementations, the HMD device 504 may display at least a portion of a scene in its FOV 510 to the user 502 (via the electronic display 102) and may track the user's attention in relation to one or more objects in the scene (based on information from the eye tracker 104), such as described with reference to FIGS. 1A and 1B. In some implementations, the HMD device 504 may further output an attention cue based on the attentiveness of the user 502. For example, the attention cue may indicate whether the user's attention is focused on the person 506.

In the example of FIG. 5, the person 506 is also wearing an HMD device 508. In some implementations, the HMD device 508 may be one example of the HMD device 100 of FIGS. 1A and 1B. In some implementations, the HMD device 504 may output the attention cue via a communication interface that communicates with the HMD device 508. Accordingly, the HMD device 508 may render the attention cue in a virtual (or XR) environment to indicate the attentiveness of the user 504. In some implementations, the HMD device 508 may mask or obfuscate the HMD device 504 in the media content displayed to the person 506 with a virtual rendering (such as an avatar) that depicts the attentiveness of the user 502.

For example, the avatar may be a visual representation of the user 502 depicted with a first facial expression to indicate that the user 502 is focused on the person 506 (such as the eyes of the avatar being in the open position or tracking the user 506) or a second facial expression to indicate that the user 502 is not focused on the person 506 (such as the eyes of the avatar being in the closed position or replaced with X's). Accordingly, the person 506 may observe the expression on the avatar (in the virtual environment) to determine the user's level of attention or engagement with the surrounding environment 500.

Figure 6:
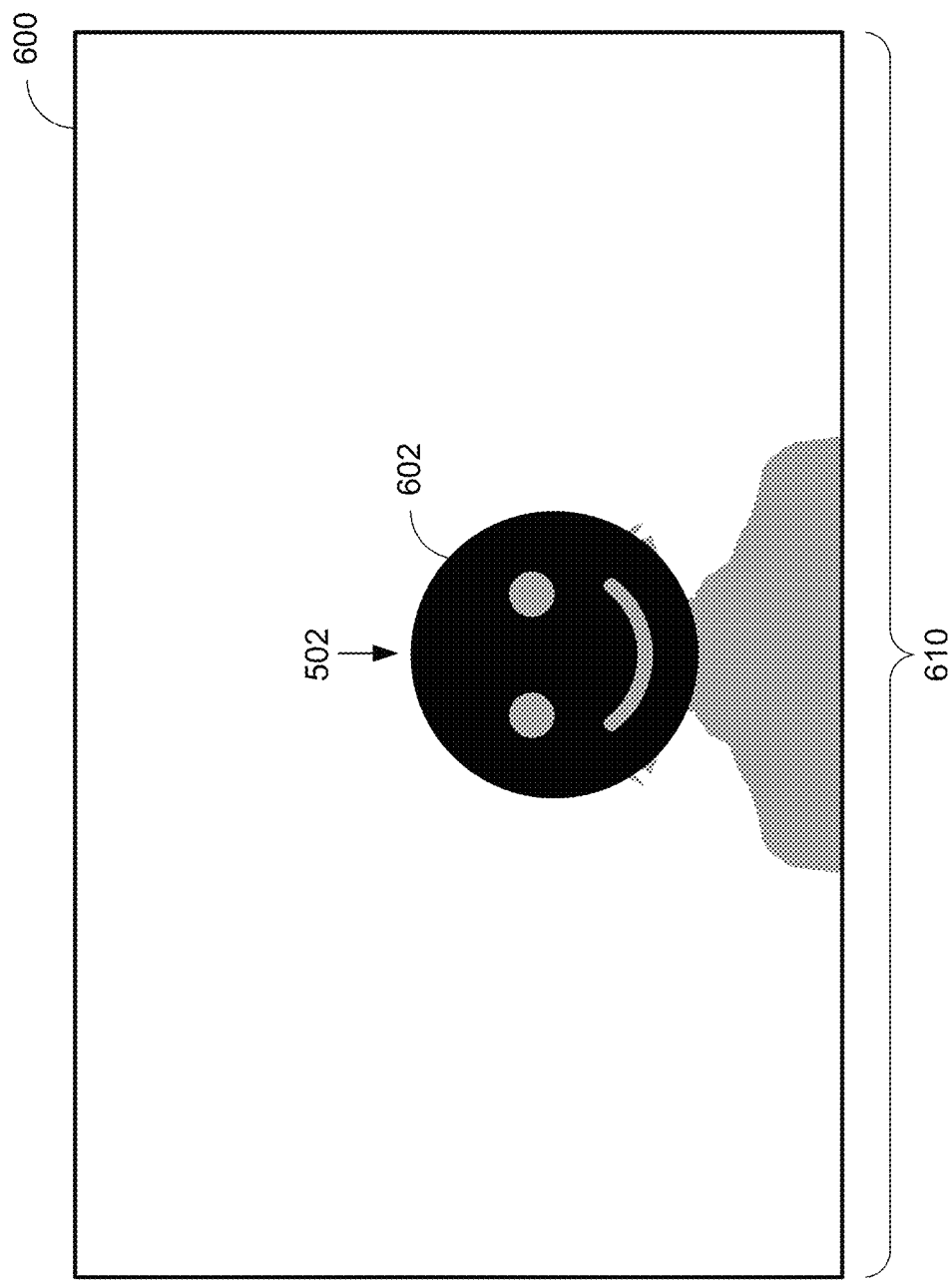
FIG. 6 shows example media content that can be rendered on a display of an HMD device.

FIG. 6 shows example media content that can be rendered on a display 600 of an HMD device. In some implementations, the HMD device may be one example of any of the HMD device 508 of FIG. 5. As shown in FIG. 6, the media content includes a scene in an FOV 610 of the HMD device 508.

In the example of FIG. 6, the user 502 and the HMD device 504 are located in the FOV 610 of the HMD device 508. In some implementations, the HMD device 508 may receive attention cues from the HMD device 504 and may mask or obfuscate the HMD device 504 in the media content rendered on the display 600. As shown in FIG. 6, the HMD device 504 (as well as the face of the user 502) is overlaid with a virtual avatar 602. In some implementations, the expression on the face of the avatar 602 may dynamically change based on the attention cues received from the HMD device 504. For example, the avatar 602 may be rendered with a first facial expression to indicate that the user 502 is focused on the person 506 or a second (or no) facial expression to indicate that the user 502 is not focused on the person 506.

Figure 7:
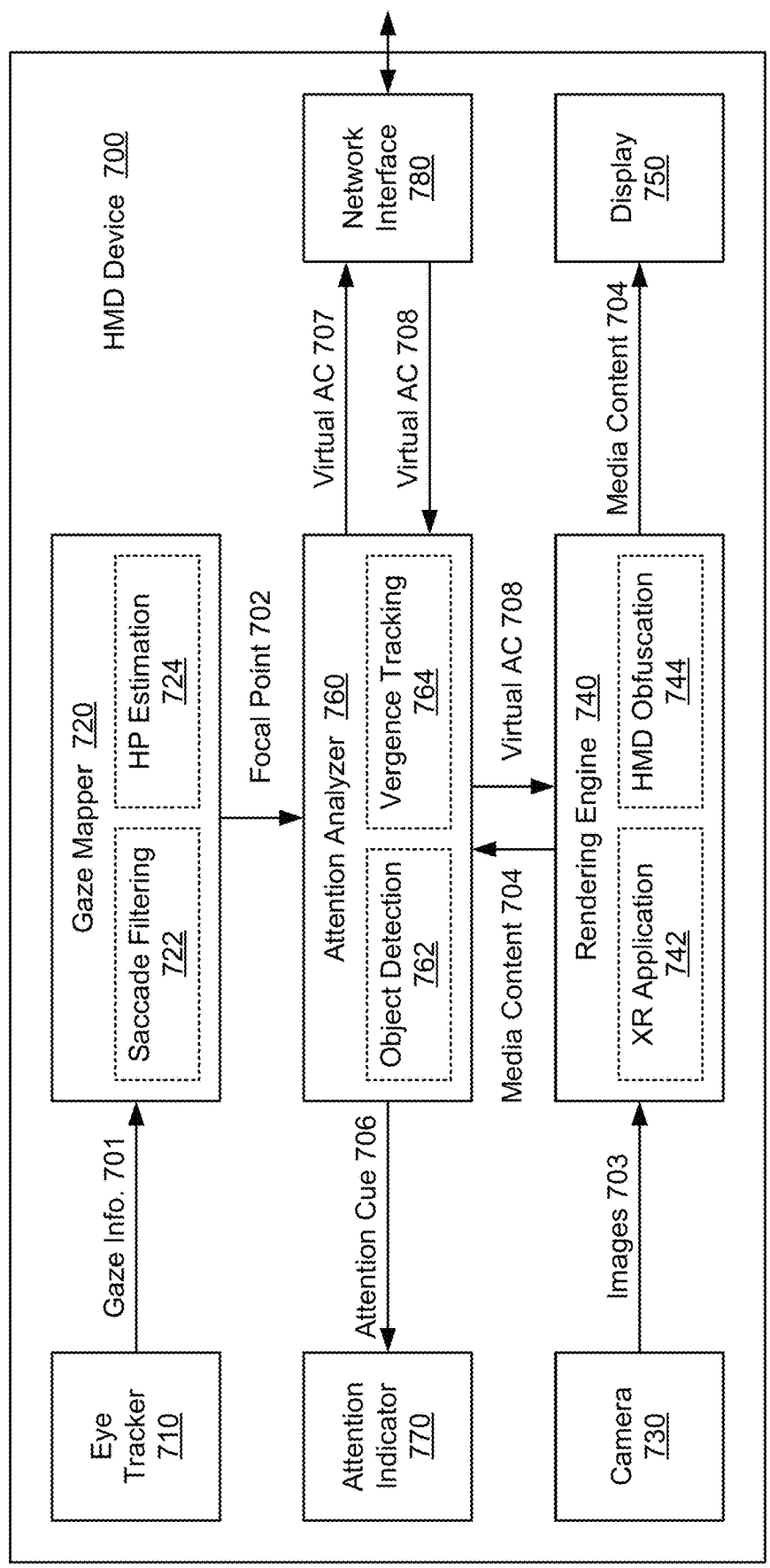
FIG. 7 shows a block diagram of an example HMD device, according to some implementations.

FIG. 7 shows a block diagram of an example HMD device 700, according to some implementations. In some implementations, the HMD device 700 may be one example of any of the HMD devices 100, 304, 504, or 508 of FIGS. 1A, 1B, 3, and 5. More specifically, the HMD device 700 may be configured to output attention cues based on an attentiveness of a user to objects in the surrounding environment. In some implementations, the HMD device 700 may include an eye tracker 710, a gaze mapper 720, a camera 730, a rendering engine 740, a display 750, and an attention analyzer 760.

In some implementations, the eye tracker 710 may be one example of the eye tracker 104 of FIGS. 1A and 1B. Thus, the eye tracker 710 may be configured to track the movements and rotations of the user's eyes and output gaze information 701 indicating the user's direction of gaze. The gaze mapper 720 maps the gaze information 701 to a focal point 702 (or region) of the display 750. For example, the focal point 702 may align with the user's direction of gaze (as indicated by the gaze information 701).

In some implementations, the gaze mapper 720 may include a saccade filtering component 722 configured to filter saccadic eye movements of the user in the received gaze information 701. Saccades are rapid eye movements that are inherent in how the eyes scan a scene. Aspects of the present disclosure recognize that such rapid eye movements, when reflected in the gaze information 701, may result in inaccurate determinations of the user's focus of attention. As such, the saccade filtering component 722 may further improve the accuracy of the focal point 702 determination. Such filtering may include correlating the motion of the user's eyes with the motion of objects within the FOV to indicate objects of attention.

In some implementations, the gaze mapper 720 may include a head-pose (HP) estimation component 724 configured to track a head pose of the user. For example, the HP estimation component 724 may receive head-pose information from one or more sensors disposed on or around the HMD device 700. The head pose information may indicate the user's head position relative to the surrounding environment. Aspects of the present disclosure recognize that the user's eyes may compensate for changes in head position when tracking an object of interest. For example, the user's eyes may track left when the head turns right to maintain focus on a particular object. As such, the HP estimation component 724 may further improve the accuracy of the focal point 702 determination. Further, one or more cameras oriented toward the FOV may be used to track the motion of the head (e.g., by multi-axis "inside out" tracking).

In some implementations, the camera 730 may be one example of the camera 106 of FIGS. 1A and 1B. Thus, the camera 730 may be configured to capture images 703 of a scene in front of the HMD device 700. The rendering engine 740 renders at least a portion of the captured images 703 as media content 704 on the display 750. In some implementations, the display 750 may be one example of the display 102 of FIGS. 1A and 1B.

In some implementations, the rendering engine 740 may include an XR application 742 configured to render one or more virtual objects in the media content 704. As described with reference to FIG. 4C, the virtual objects may be overlaid on the scene depicted in the images 703. As such, the HMD device 700 enables the user to interact with persons or objects in a physical environment in combination with immersive elements of a virtual environment.

In some implementations, the attention analyzer 760 may compare the focal point 702 with the media content 704 rendered on the display 750 to determine the user's attentiveness to one or more objects in the scene. For example, the attention analyzer 760 may determine which, if any, objects rendered on the display 750 coincide or align with the focal point 702. In some implementations, the attention analyzer 760 may determine whether the user's attention is focused on a physical person or object in the captured images 703 (such as in the FOV of the camera 730). In some implementations, attention tracking also may be used to improve the resolution of foveal regions of the display (as in foveated rendering). In some other implementations, the attention analyzer 760 may determine whether a person or object in the captured images 703 is occluded by one or more virtually-rendered objects (such as objects associated with the XR application 742).

In some implementations, the attention analyzer 760 may include an object detection component 762 configured to detect objects in the media content 704. For example, the object detection component 762 may identify objects of interest in the media content 704 (such as human faces or HMD devices). In some implementations, the object detection component 762 may further indicate whether the detected objects are physical objects that are present in the user's surrounding environment (such as in the FOV of the camera 730) or virtual objects that are present only in the virtual environment (or located beyond the FOV of the camera 730).

In some implementations, the attention analyzer 760 may include a vergence tracking component 764 configured to track a vergence of the user's eyes. For example, the vergence tracking component 764 may receive depth information from one or more sensors disposed on the HMD device 700. The depth information may indicate a depth of focus of the user's eyes. Aspects of the present disclosure recognize that, in a physical environment, the direction of gaze of the user's eyes may converge at an object located a distance away from the user's face (referred to as the "focal distance"). When the same object is viewed in a virtual environment, the focal distance may be significantly shorter due to the proximity of the display 750 from the user's face. However, the angle of the user's eyes (referred to as the "vergence distance") may be the same. Thus, the depth information can be combined with knowledge of the objects in the media content 704 (such as a virtual depth of each object) to more precisely determine the focus of the user's attention.

In some implementations, the attention analyzer 760 may output an attention cue 706, via an attention indicator 770, indicating the attentiveness of the user. In some implementations, the attention indicator 770 may be one example of any of the attention indicators 110, 220, or 306 of FIGS. 1B, 2, and 3, respectively. Thus, the attention indicator 770 may include one or more visual or audio output components that can be used to render or output the attention cue 706. In some implementations, the attention indicator 770 may output a pattern of sounds or lights (such as images) to indicate that the user's attention is focused on a person in the surrounding environment (such as described with reference to FIGS. 2A and 4A). In some other implementations, the attention indicator 770 may output a different pattern of sounds or lights to indicate that the user's attention is not focused on the person in the surrounding environment (such as described with reference to FIGS. 2B, 4B, and 4C).

In some other implementations, the attention analyzer 760 may output a virtual attention cue (AC) 707, via a network interface 780, indicating the attentiveness of the user. The network interface 780 may use any communication technologies to facilitate communications between HMD devices (such as the HMD devices 504 and 508 of FIG. 5). Examples suitable communication technologies include, but are not limited to, Inter-Integrated Circuit (I²C), Serial Peripheral Interface (SPI), PS/2, Universal Serial bus (USB), Bluetooth®, Infrared Data Association (IrDA), and various radio frequency (RF) communication protocols defined by the IEEE 802.11 standard or other wireless communication standards such as 5G or UltraWideBand (UWB). In some implementations, the virtual AC 707 may be used by the receiving device to mask or obfuscate the HMD device 700 (such as described with reference to FIGS. 5 and 6).

In some implementations, the network interface 780 also may receive a virtual AC 708 from another HMD device. For example, the other HMD device may be present in the same virtual environment as the HMD device 700. More specifically, the virtual AC 708 may indicate an attentiveness of a user of the other HMD device. In some implementations, the other HMD device also may be present in the surrounding environment. For example, the other HMD device may be an object in the images 703 captured by the camera 730. In some implementations, the rendering engine 740 may include an HMD obfuscation component 744 configured to mask or obfuscate the other HMD device based on the virtual AC 708. For example, when rendering the media content 704, the HMD obfuscation component 744 may overlay the other HMD device with a virtual rendering that depicts the attentiveness of the user of that HMD device (such as an avatar of the user, as described with reference to FIG. 6).

Figure 8:
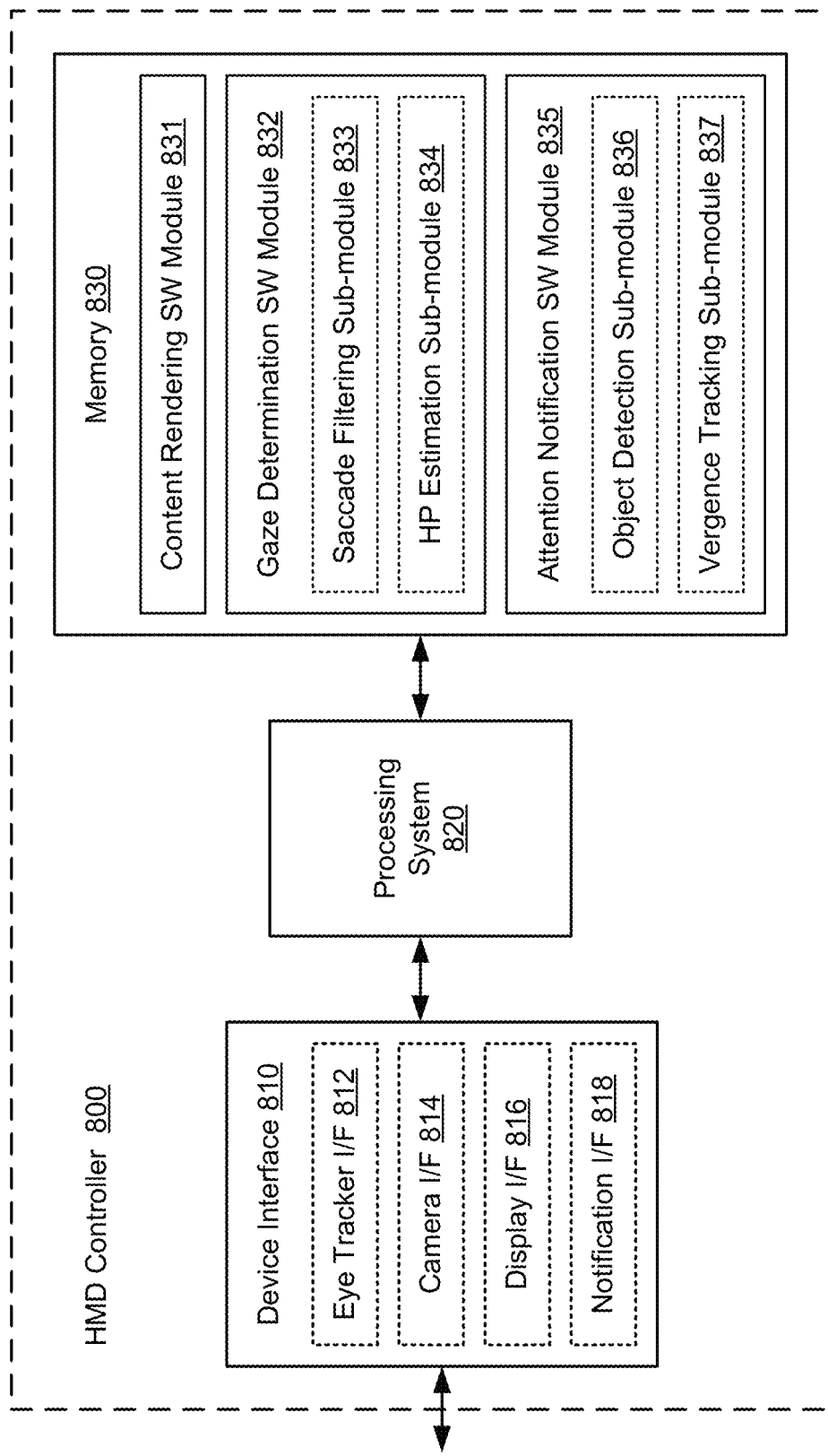
FIG. 8 shows an example controller for an HMD device, according to some implementations.

FIG. 8 shows an example controller 800 for an HMD device, according to some implementations. In some implementations, the HMD device may be one example of any of the HMD devices 100, 304, 504, or 508 of FIGS. 1A, 1B, 3, and 5. Thus, the HMD device may be configured to output attention cues based on an attentiveness of a user to objects in the surrounding environment. In some implementations, the controller 800 may include a device interface 810, a processing system 820 and a memory 830.

The device interface 810 is configured to communicate with one or more components of the HMD device. In some implementations, the device interface 810 may include an eye tracker interface (I/F) 812, a camera interface 814, a display interface 816, and a notification interface 818. The eye tracker interface 812 may receive gaze information from an eye tracker disposed on an inner surface of the HMD device (such as any one of the eye trackers 104 or 710 of FIGS. 1A and 7, respectively). The camera interface 814 may receive images captured by a camera disposed on an outer surface of the HMD device (such as any one of the cameras 106 or 730 of FIGS. 1B and 7, respectively). The display interface 816 may output media content to an electronic display (such as any one of the displays 102 or 750 of FIGS. 1A and 7, respectively).

In some implementations, the notification interface 818 may output attention cues to an attention indicator (such as any one of the attention indicators 110 or 770 of FIGS. 1B and 7, respectively). In some other implementations, the notification interface 818 may output attention cues to, or receive attention cues from, another HMD device (such as the HMD device 508 of FIG. 5). In such implementations, the notification interface 818 may be one example of the network interface 780 of FIG. 7.

The memory 830 may include a non-transitory computer-readable medium (including one or more nonvolatile memory elements, such as EPROM, EEPROM, Flash memory, a hard drive, and the like) that may store at least the following software (SW) modules:
- a content rendering SW module 831 to render, on the electronic display, media content including at least a portion of a scene in an FOV of the camera;
- a gaze determination SW module 832 to determine a direction of gaze of the user of the HMD device based on the received gaze information, the gaze determination SW module 832 further including:
  a saccade filtering sub-module 833 to filter saccadic eye movements associated with the received gaze information; and
  a head-pose (HP) estimation sub-module 834 to determine a head pose of the user; and
an attention notification SW module 835 to map the user's direction of gaze to a focal point or region on the electronic display and to generate attention cues based on the intersection of the focal point and the media content rendered on the electronic display, the attention notification SW module 835 including:
  an object detection sub-module 836 to detect objects of interest in the media content rendered on the electronic display; and
  a vergence tracking sub-module 837 to determine a vergence of the user's eyes.

Each software module includes instructions that, when executed by the processing system 820, causes the controller 800 to perform the corresponding functions.

The processing system 820 may include any suitable one or more processors capable of executing scripts or instructions of one or more software programs stored in the controller 800 (such as in memory 830). For example, the processing system 820 may execute the content rendering SW module 831 to render, on the electronic display, media content including at least a portion of a scene in an FOV of the camera. The processing system 820 also may execute the gaze determination SW module 832 to determine a direction of gaze of the user of the HMD device based on the received gaze information. In executing the gaze determination SW module 832, the processing system 820 may further execute the saccade filtering sub-module 833 to filter saccadic eye movements associated with the received gaze information and may execute the HP estimation sub-module 834 to determine a head pose of the user.

The processing system 820 also may execute the attention notification SW module 835 to map the user's direction of gaze to a focal point or region on the electronic display and to generate attention cues based on the intersection of the focal point and the media content rendered on the electronic display. In executing the attention notification SW module 835, the processing system 820 may further execute the object detection sub-module 836 to detect objects of interest in the media content rendered on the electronic display and may execute the vergence tracking sub-module 837 to determine a vergence of the user's eyes.

Figure 9:
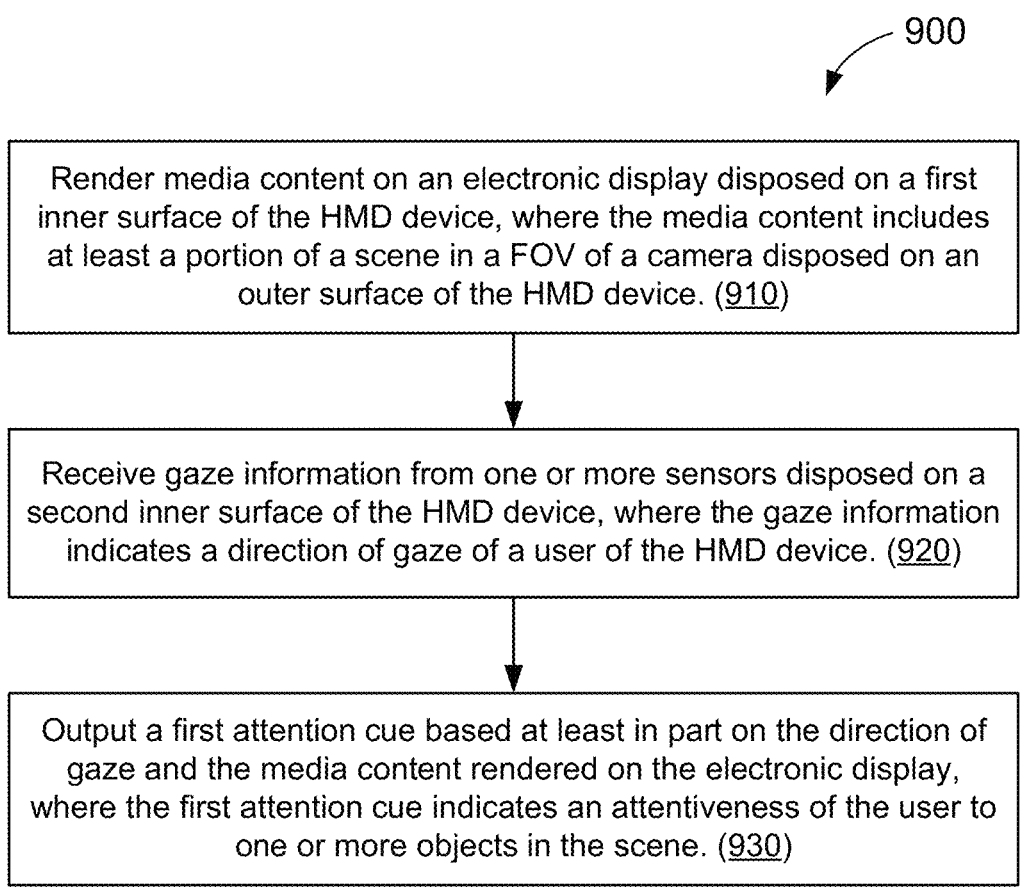
FIG. 9 shows an illustrative flowchart depicting an example operation for generating attention cues, according to some implementations.

FIG. 9 shows an illustrative flowchart depicting an example operation 900 for generating attention cues, according to some implementations. In some implementations, the example operation 900 may be performed by an HMD device (such as any of the HMD devices 100, 304, 504, or 508 of FIGS. 1A, 1B, 3, and 5) to output attention cues based on an attentiveness of a user to objects in the surrounding environment.

The HMD device renders media content on an electronic display disposed on a first inner surface of the HMD device, where the media content includes at least a portion of a scene in a FOV of a camera disposed on an outer surface of the HMD device (910). In some implementations, the media content may further include one or more virtual objects associated with an XR application. As described with reference to FIG. 4C, the virtual objects may be overlaid on the scene depicted in the media content. As such, the HMD device enables the user to interact with persons or objects in a physical environment in combination with immersive elements of a virtual environment.

The HMD device receives gaze information from one or more sensors disposed on a second inner surface of the HMD device, where the gaze information indicates a direction of gaze of a user of the HMD device (920). In some implementations, the HMD device may filter saccadic eye movements of the user from the received gaze information. In some implementations, the HMD device may further receive head pose information indicating a head pose of the user. In such implementations, the HMD device may use the head pose information to refine the determination of the user's direction of gaze.

The HMD device outputs a first attention cue based at least in part on the direction of gaze and the media content rendered on the electronic display, where the first attention cue indicates an attentiveness of the user to one or more objects in the scene (930). For example, the HMD device may determine which (if any) objects rendered on the display coincide or align with the user's direction of gaze. In some implementations, the HMD device may determine whether the user's attention is focused on a physical person or object in the surrounding environment (such as described with reference to FIGS. 4A and 4B). In some other implementations, the HMD device may determine whether a physical person or object in the surrounding environment is occluded by one or more virtually-rendered objects (such as described with reference to FIG. 4C).

In some implementations, the HMD device may output the attention cue via an attention indicator disposed on an outer surface of the HMD device (such as the attention indicator 110 of FIG. 1B). For example, the attention indicator may include one or more visual or audio output components that can be used to render or output the attention cue. In some other implementations, the HMD device may output attention cue, via a network interface, to another HMD device. For example, the other HMD device may mask or obfuscate the HMD device in its FOV based on the received attention cue (such as described with reference to FIGS. 5 and 6).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, implementations have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method performed by a first head-mounted display (HMD) device, comprising:
    rendering media content on an electronic display disposed on a first inner surface of the first HMD device, the media content including at least a portion of a scene in a field-of-view (FOV) of a camera disposed on an outer surface of the first HMD device;
    receiving gaze information from one or more sensors disposed on a second inner surface of the first HMD device, the gaze information indicating a direction of gaze of a user of the first HMD device;
    outputting a first attention cue based at least in part on the direction of gaze and the media content rendered on the electronic display, the first attention cue indicating an attentiveness of the user to one or more objects in the scene;
    receiving a second attention cue from a second HMD device in the FOV of the camera; and
    obfuscating the second HMD device in the media content based on the second attention cue.

2. The method of claim 1, wherein the media content further includes one or more virtual objects associated with an extended reality (XR) application, the first attention cue indicating whether an object in the scene is occluded by the one or more virtual objects in the media content.

3. The method of claim 1, further comprising:
    filtering saccadic eye movements associated with the received gaze information; and
    mapping the direction of gaze to a region of the media content based at least in part on the filtering of the saccadic eye movements.

4. The method of claim 1, further comprising:
    receiving head pose information indicating a head pose of the user of the first HMD device; and
    mapping the direction of gaze to a region of the media content based at least in part on the head pose of the user.

5. The method of claim 1, further comprising:
    receiving depth information indicating a vergence of the user's eyes; and
    mapping the direction of gaze to a region of the media content based at least in part on the vergence of the user's eyes.

6. The method of claim 1, wherein the first attention cue is output via an attention indicator disposed on the outer surface of the first HMD device.

7. The method of claim 6, wherein the attention indicator projects the direction of gaze on the outer surface of the first HMD device.

8. The method of claim 6, wherein the attention indicator projects an image representing the user's eyes based on the received gaze information.

9. The method of claim 1, wherein the first attention cue is output via a communication interface that communicates with the second HMD device.

10. The method of claim 1, wherein the second HMD device is obfuscated by a visual representation of a user of the second HMD device.

11. A controller for a first head-mounted display (HMD) device, comprising:
    a processing system; and
    a memory storing instructions that, when executed by the processing system, causes the controller to:
        render media content on an electronic display disposed on a first inner surface of the first HMD device, the media content including at least a portion of a scene in a field-of-view (FOV) of a camera disposed on an outer surface of the first HMD device;
        receive gaze information from one or more sensors disposed on a second inner surface of the first HMD device, the gaze information indicating a direction of gaze of a user of the first HMD device;
        output a first attention cue based at least in part on the direction of gaze and the media content rendered on the electronic display, the first attention cue indicating an attentiveness of the user to one or more objects in the scene;
        receive a second attention cue from a second HMD device in the portion of the scene; and
        obfuscate the second HMD device in the media content based on the second attention cue.

12. The controller of claim 11, wherein the media content further includes one or more virtual objects associated with an extended reality (XR) application, the first attention cue indicating whether an object in the scene is occluded by the one or more virtual objects in the media content.

13. The controller of claim 11, wherein execution of the instructions further causes the controller to:
    filter saccadic eye movements associated with the received gaze information; and
    map the direction of gaze to a region of the media content based at least in part on the filtering of the saccadic eye movements.

14. The controller of claim 11, wherein execution of the instructions further causes the controller to:
    receive head pose information indicating a head pose of the user of the first HMD device; and
    map the direction of gaze to a region of the media content based at least in part on the head pose of the user.

15. The controller of claim 11, wherein execution of the instructions further causes the controller to:
    receiving depth information indicating a vergence of the user's eyes; and
    map the direction of gaze to a region of the media content based at least in part on the vergence of the user's eyes.

16. The controller of claim 11, wherein the first attention cue is output via an attention indicator disposed on the outer surface of the first HMD device.

17. The controller of claim 11, wherein the first attention cue is output via a communication interface that communicates with the second HMD device.

* * * * *